United States Patent [19]

Eisenhauer

[11] 4,012,851
[45] * Mar. 22, 1977

[54] UNIVERSAL PLANISPHERE COMPLETE GUIDANCE AND COMPUTER SYSTEM

[76] Inventor: William A. Eisenhauer, Van Wert, Ohio

[ * ] Notice: The portion of the term of this patent subsequent to Jan. 7, 1992, has been disclaimed.

[22] Filed: Jan. 6, 1975

[21] Appl. No.: 538,579

Related U.S. Application Data

[60] Division of Ser. No. 268,646, July 3, 1972, Pat. No. 3,858,334, which is a continuation-in-part of Ser. No. 500, Jan. 5, 1970, Pat. No. 3,678,710, which is a continuation of Ser. No. 600,920, Dec. 12, 1966, abandoned, which is a continuation-in-part of Ser. No. 369,958, May 25, 1964, Pat. No. 3,290,799, which is a continuation-in-part of Ser. No. 271,658, April 9, 1963, Pat. No. 3,251,143, which is a continuation-in-part of Ser. No. 851,648, Nov. 9, 1959, Pat. No. 3,088,228.

[52] U.S. Cl. .................................................. 35/44
[51] Int. Cl.² ........................................ G09B 29/00
[58] Field of Search ............. 35/44, 43; 58/3, 42.5, 58/43

[56] References Cited

UNITED STATES PATENTS

| 497,917 | 5/1893 | Gleason | 35/44 |
|---|---|---|---|
| 531,060 | 12/1894 | Ormsby | 35/44 |
| 1,873,595 | 8/1932 | Johnson | 35/44 |
| 2,921,386 | 1/1960 | Stefano | 35/44 |
| 3,290,799 | 12/1966 | Eisenhauer | 35/44 |
| 3,673,710 | 7/1972 | Eisenhauer | 35/44 |
| 3,858,334 | 1/1975 | Eisenhauer | 35/44 |

FOREIGN PATENTS OR APPLICATIONS

| 822,910 | 11/1951 | Germany | 35/44 |
|---|---|---|---|
| 882,320 | 7/1953 | Germany | 35/44 |
| 595,089 | 11/1947 | United Kingdom | 35/44 |

*Primary Examiner*—William H. Grieb
*Attorney, Agent, or Firm*—Whittemore, Hulbert & Belknap

[57] ABSTRACT

A planisphere for providing displays and effecting calculations in both astronomy and navigation and the method of operation thereof. The planisphere structure includes a plurality of substantially circular, concentric, flat dials which are progressively larger in diameter toward a central, largest diameter dial on both sides of the central, largest diameter dial. The dials are pivotally mounted centrally and have both astronomy and navigation oriented scales as well as star and polar azimuthal equidistant projection maps thereon. Reference rules and scale indicators, Greenwich indicators and Aries indicators, the latter three of which are part of specific planisphere dials, extend radially outwardly of the largest diameter dial on both sides of the planisphere and are connected together radially outwardly of each other respectively so that they may be readily moved relative to each other in angularly positioning the dials in operation of the planisphere. An altitude and azimuth circle reference indicator is provided with the planisphere to aid in triangulation operations and determining relative altitude and azimuth of celestial bodies when it is located on the assumed coordinate position of the navigator.

4 Claims, 11 Drawing Figures

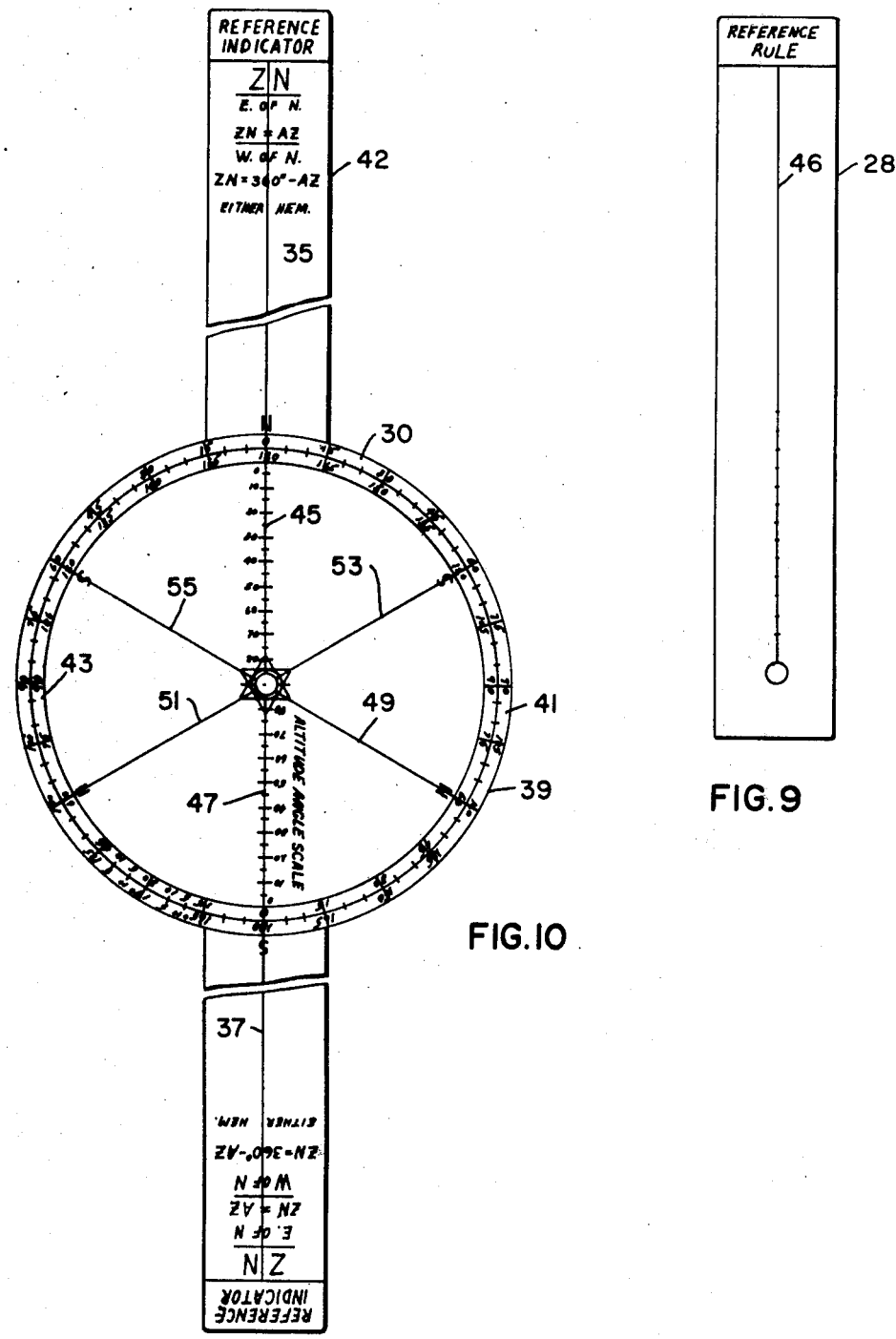

UNIVERSAL PLANISPHERE COMPLETE GUIDANCE AND COMPUTER SYSTEM

CROSS REFERENCE TO RELATED APPLICATIONS

The present application is a division of application Ser. No. 268,646, filed July 3, 1972, now U.S. Pat. No. 3,858,334, issued Jan. 7, 1975, which is a continuation-in-part of application Ser. No. 500, filed Jan. 5, 1970, now U.S. Pat. No. 3,678,710, issued July 4, 1972, which is a streamlined continuation application of application Ser. No. 600,920, filed Dec. 12, 1966, now abandoned, which is a continuation-in-part of application Ser. No. 369,958, filed May 25, 1964, now U.S. Pat. No. 3,290,799, issued Dec. 13, 1966, which is a continuation-in-part of application Ser. No. 271,658, filed Apr. 9, 1963, now U.S. Pat. No. 3,251,143, issued May 17, 1966, which is a continuation-in-part of application Ser. No. 851,648, filed Nov. 9, 1959, now U.S. Pat. No. 3,088,228, issued May 7, 1963.

BACKGROUND OF THE INVENTION

1. Field of the Invention

The invention relates to planispheres and refers more specifically to planisphere structure for accomplishing both astronomical and navigational calculations and displays. Specifically, the planisphere of the invention includes structure for and may be operated to provide either an overhead or a ground position display of heavenly bodies in both the northern and southern hemispheres at different longitudes and latitudes in a Copernican manner. Hour angle circle diagrams and navigator's time diagrams may be programmed on the planisphere of the invention which also provides structure for directly indicating altitude and azimuth of celestial bodies and navigation east and navigation west scales to enable a correct conceptual approach to navigation problems. Information concerning stars useful in navigation is also obtainable from the structure of the planisphere of the invention.

In operation, the planisphere may be programmed to provide an overhead or ground position display of the stars in either of the northern or southern hemispheres viewable from different predetermined latitudes on a predetermined day at a selected time in a Copernican manner. Further, hour angle circle diagrams and navigator's time diagrams may be solved on the planisphere of the invention to provide rapid, accurate information in conjunction with readily available printed reference material without the possibility of mathematical computation errors. Altitude and azimuth information with respect to celestial bodies is also available from the planisphere of the invention.

Also, the relative direction of navigational stars and their magnitude, declination and number are provided on one modification of the planisphere.

2. Description of the Prior Art

In the past, structure for astronomical and navigational displays and calculations have generally been restricted to use in either astronomy or navigation. Further, the prior structures have usually been limited to use in a single hemisphere and to a predetermined latitude.

No prior devices for solving hour angle circle diagrams or providing time diagram information without mathematical computation with the ease and facility of the planisphere of the invention or which provide a conceptually correct approach to navigation problems by the use of both navigation east and navigation west scales are known. In addition, while those engaged in prior navigational computations have sometimes incidentally used the Greenwhich meridian as a starting point, in accordance with the present invention and in the present system, the use of the Greenwich meridian as a starting point is emphasized.

Wherein navigational star information has been provided before, it has usually been in the form of charts and lists rather than on a planisphere scale in combination with other navigational and astronomical information.

In particular, the star finder and identifier number H.O. 2102-D previously published by and obtainable from the United States Naval Oceanographic Office is limited in practical use to finding and identifying stars. It cannot function as a substitute for a time diagram since the mean time scales necessary for that purpose are not available. Orienting the sky map for either hemisphere properly by directing the south meridian or the longitude position due south from the northern hemisphere standpoint and the north meridian due north in the southern hemisphere is the prime and only limited, practical purpose of H.O. 2102-D in the system of celestial navigation. Sight reduction according to present notions of time approximations of the nearest half-hour or so does not require accuracy with respect to azimuth and altude even to the extent of the grid application by rough interpolation provided by H.O. 2102-D. In case accuracy is a requirement for sight reduction, Tables of Computed Altitude and Azimuth, published by the United States Hydrograhic Office Publication H.O. 214, is a quickly available and more satisfactory source to serve that purpose.

Also, it will be noted that H.O. 2102-D is disintegrated with respect to the many parts of dissembled structure necessary to even its limited ultimate use, in contrast to the completely integrated, totally interrelated structure of the planisphere of the invention.

SUMMARY OF THE INVENTION

The planisphere structure of the present invention provides concentric, relatively rotatable, different diameter dials of progressively larger diameter from outer dials on both sides of a central dial to the central dial having both navigation and astronomy scales and diagrams thereon with which information, such as obtained from the usual hour angle circle and navigator's time diagram, may be obtained without mathematical computation and in a conceptually correct manner.

Interchangeable sky maps are provided on dials of the planisphere of the present invention for displaying heavenly bodies, such as stars, in both the northern and southern hemispheres in both a zenith or overhead configuration and a ground position configuration to facilitate either astronomical or navigational use of the planisphere in either hemisphere. In conjunction with the sky maps, transparent sky mask dials are provided having a plurality of horizon indications thereon, whereby the planisphere may be used at different latitudes as well as in both the northern and southern hemispheres. Greenwich dials which include an azimuthal equidistant projection of the northern and southern hemispheres thereon are provided between the sky map dials in a ground position configuration and the sky mask dials to aid in the Copernican understanding of the display of celestial bodies on a predetermined day at a selected time. The Greenwich dials are stored behind the sky map dials on the overhead side of the planisphere. In addition, navigation east and navigation west scales are provided on radially outer dials which also have a Greenwhich G indication thereon to facilitate correct conceptual operation of the planisphere of the invention.

Reference rules are provided extending radially outwardly from the center of the planisphere at which point they are pivotally mounted. The reference rules extend outwardly beyond the outer periphery of the largest diameter dial on both sides of the planisphere where they are connected. The reference rules aid in automatically aligning the various dials of the planisphere in use thereof. The automatic alignment of both sides of the planisphere on programming either side of the planisphere due to the planisphere structure provided and the two-sky configuration thereof is emphasized.

Optionally a reference indicator extending radially in both north and south directions from a central azimuth altitude circle is provided for navigational use with the planisphere. With the reference indicator center positioned over the assumed position of the navigator on the ground configuration sky map dials, the relative azimuth and altitude of celestial bodies displayed on the associated sky maps may be determined directly and navigational triangulation sight considerations are facilitated.

Scale indicators having a viewing window therein for viewing the scales on the larger diameter dials extend radially outwardly from the sky masks on both sides of the planisphere structure. The scale indicators are connected radially outwardly of the largest diameter dial. Similarly, Greenwich indicators are provided on the Greenwich dials and Aries indicators are provided on the sky map dials on both sides of the planisphere. The Greenwich and Aries indicators are also connected radially outwardly of the largest diameter dial. In the planisphere of the invention, the reference rules, scale indicators and Aries indicators are progressively shorter whereby the reference rules, scale indicators, and Aries indicators may readily pass through or over each other during programming of the planisphere.

Navigational star information is provided on one of the relatively rotatable dials in a ground position configuration for the principal navigational stars in one modification of the planisphere of the invention.

BRIEF DESCRIPTION OF THE DRAWINGS

FIG. 9 is a plan view of the reference rules of the planisphere of FIG. 1.

FIG. 10 is a plan view of an enlarged reference indicator for use with the planisphere of FIG. 1 including an azimuth-altitude circle in accordance with the invention.

DESCRIPTION OF THE PREFERRED EMBODIMENT

Figure 1:
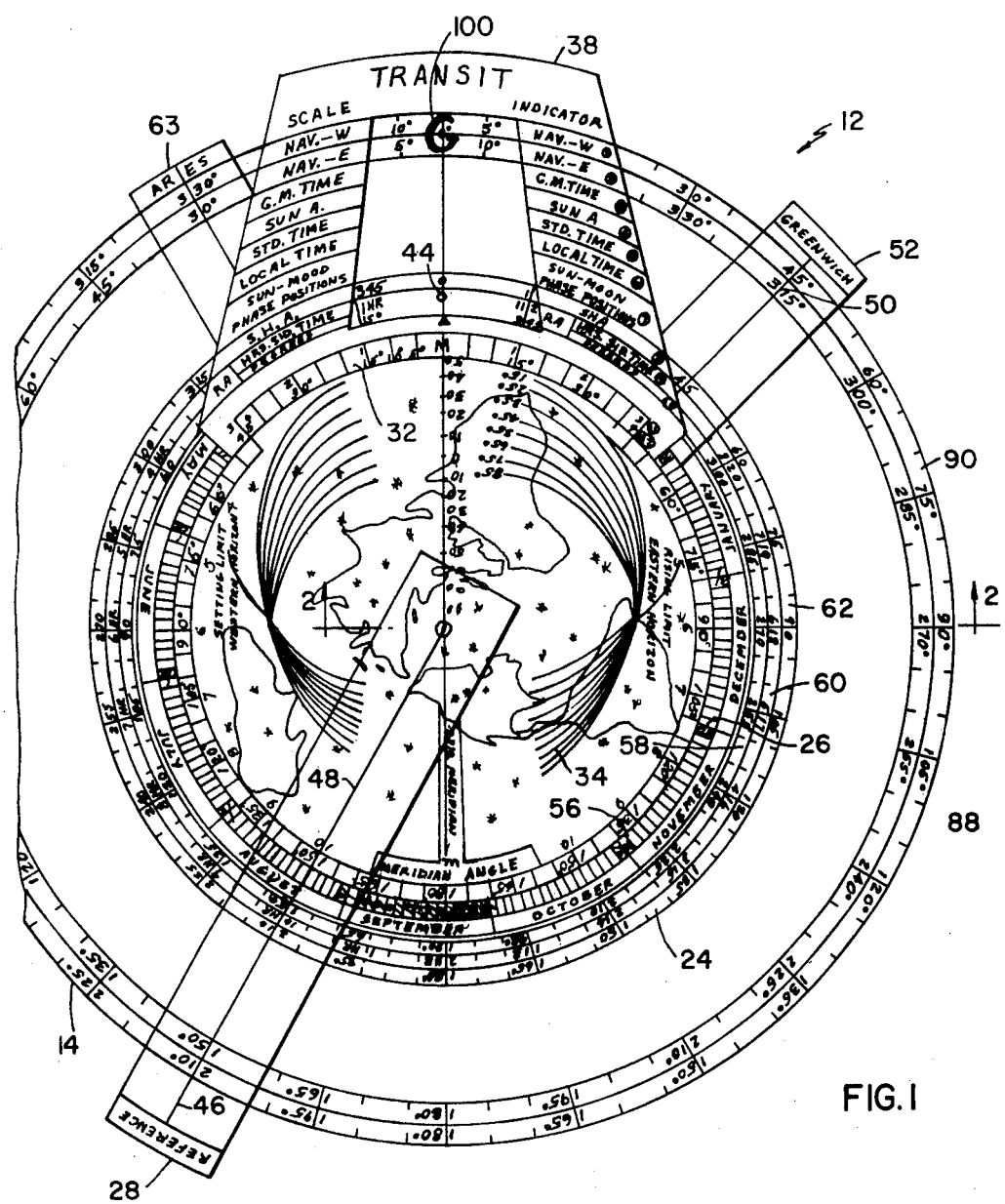
FIG. 1 is a partial composite plan view of one side of a planisphere constructed in accordance with the invention for use with an assumed position in the northern hemisphere which has a ground position north configuration and includes a ground position north sky map dial.
Figure 2:
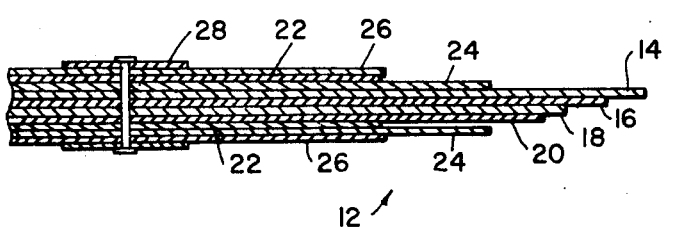
FIG. 2 is a partial section view of the planisphere illustrated in FIG. 1, taken substantially on the line 2—2 in FIG. 1.

The planisphere 12, as shown in FIG. 1, includes the navigation east and west central dial 14, the Greenwich mean time and sun angle dial 16, a standard time dial 18, a local time dial 20, the Greenwich dials 22, the sky map dials 24 and sky mask dials 26. The planisphere 12 is completed with reference rules 28. Reference indicator 30, shown in FIG. 10, is also provided for use with the planisphere 12. The reference rules 28 are pivotally mounted concentrically with the dials 14, 16, 18, 20, 22, 24 and 26 of the planisphere 12, as illustrated in FIGS. 1 and 2. Dials 22, 24 and 26, as well as the reference rules 28, are provided on each side of the single central dial 14. In the embodiment of the invention shown in FIGS. 1 through 10, the dials 16, 18 and 20 are provided only on one side of the planisphere. The reference indicator or altitude and azimuth circle 30 is not mounted on planisphere 12, but may be centered on an observer's longitude and latitude at the assumed position of the navigator on the maps provided on the dials of the planisphere for use as will be seen subsequently.

Figure 7:
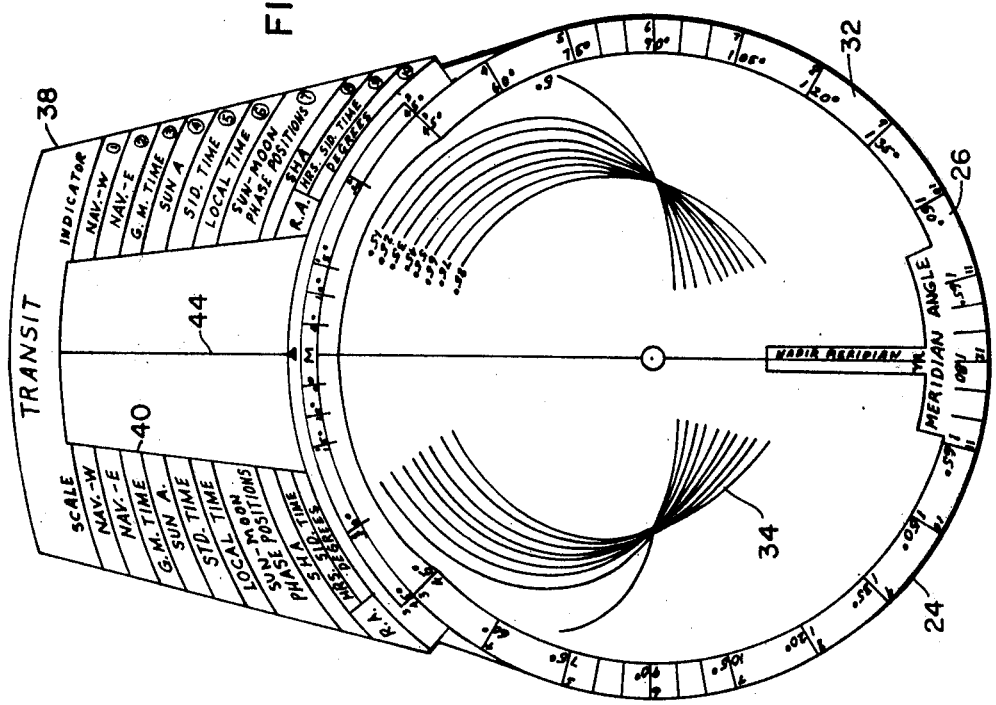
FIG. 7 is a plan view of the sky mask dials of the planisphere of FIG. 1.

As shown in FIG. 7, the sky mask dials 26 are constructed of clear plastic or some similar clear, form-retaining but flexible material for the most part and include a meridian angle scale 32 around the outer periphery thereof which is calibrated in hours and degrees in opposite directions from the meridian at M to the nadir meridian at m. A plurality of horizon configurations 34 are provided on the sky mask dials 26 to delineate the horizon of an observer at different latitudes with respect to the sky maps 36 on the sky map dials 24. Thus, the planisphere 12 may be used at a plurality of different latitudes.

The sky mask dials 26 are further provided with scale indicator portions 38 extending radially outwardly from one edge thereof, as shown in FIG. 7. The scale indicator portions 38 have a clear window 40 therein across which a meridian indicator 44 is placed and through which portions of the other dials may be viewed in operation of the planisphere 12. The scales on the dials 14, 16, 18, 20, 22 and 24 are designated on the scale indicator portions 38 of the sky mask dials 26.

The reference rules 28, as shown best in FIG. 9, include a reference indicator line 46 thereon and are also constructed of clear plastic.

The reference indicator or altitude and azimuth circle 30, as shown best in FIG. 10, is universal and includes a circular portion 39 and a generally linear portion 42. The circular portion 39 has azimuth scales 41 and 43 thereon extending respectively from zero to 180 degrees from north and from zero to 180 degrees from south. The linear portion 42 includes altitude angle scales 45 and 47 extending in opposite directions toward the center thereof along north and south reference lines 35 and 37. On the ends of the linear portion 42, the azimuth formula for azimuth east of north and west of north in either hemisphere is provided. Centrally, a first triangle is provided having an apex pointing along the axis of the linear portion 42 of the reference indicator 30 in a north direction. Reference lines 49 and 51 are provided at 120 degrees both east and west of the reference line 35 which are labeled N and which pass through the intersections of the sides and base of the first triangle which is an equilateral triangle. The triangle and reference lines aid in sighting celestial bodies for navigational triangulation computations. Similarly, a second triangle and reference lines 53 and 55, 120 degrees east and west of the south reference line 37 on the linear portion 42 of the reference indicator 30 are provided for use in sighting stars in navigational triangulation.

In use for surface navigation, the reference indicator must be centered at an assumed position of an observer on an azimuthal equidistant projection sky map centered at the assumed position of the navigator and the reference indicator rotated to position the reference line north or south over a selected star on the sky map or to the reference given in inspection tables in H.O. 214 and the azimuth and altitude of the reference star can then be determined directly from the scales on the reference indicator read in relation to true north and south. Further, with the 120° reference lines on the indicator, triangulation sightings of additional selected stars are facilitated with the indicator so oriented.

Figure 8:
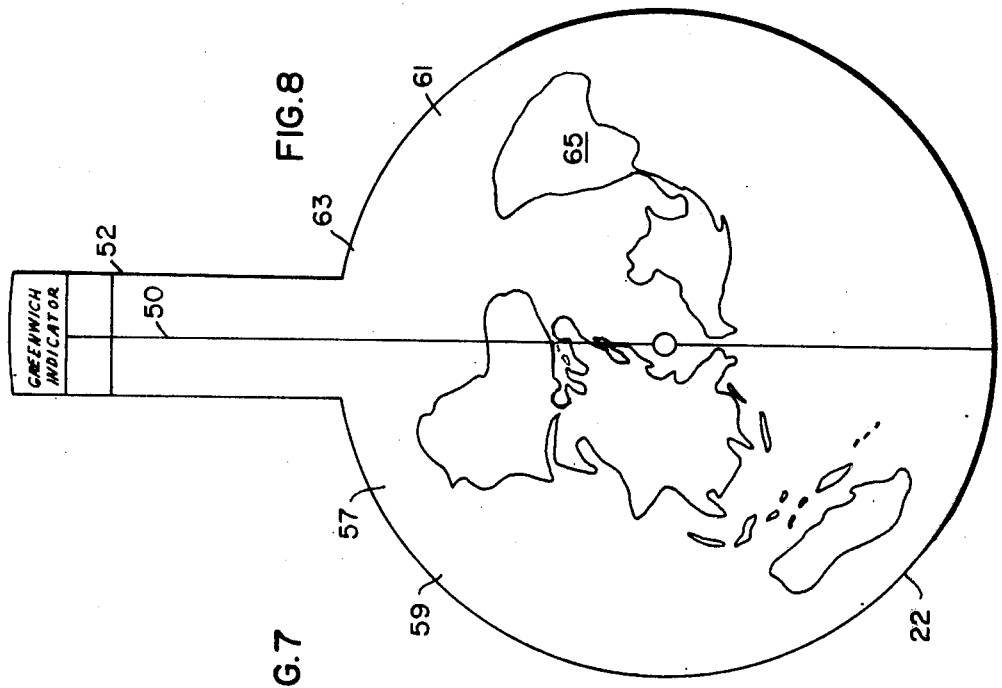
FIG. 8 is a plan view of one of the Greenwich dials of the planisphere of FIG. 1 having a northern hemisphere polar azimuthal equidistant projection thereon.

The Greenwich indicator dial 22 illustrated in FIG. 8 is in a ground position north configuration with a northern hemisphere azimuthal equidistance polar map 65 thereon. The zero hour and degree indicator 50 is provided on the Greenwich indicator portion 52 extending radially from the Greenwich indicator dial 22, as shown in FIG. 8. Since it is desired to use a Greenwich indicator dial 22 for planispheres relating to both north and south hemispheres, an azimuthal equidistant configuration centered at the South Pole is required on the other dial 22. The Greenwich indicator dials are also of clear plastic.

Figure 3:
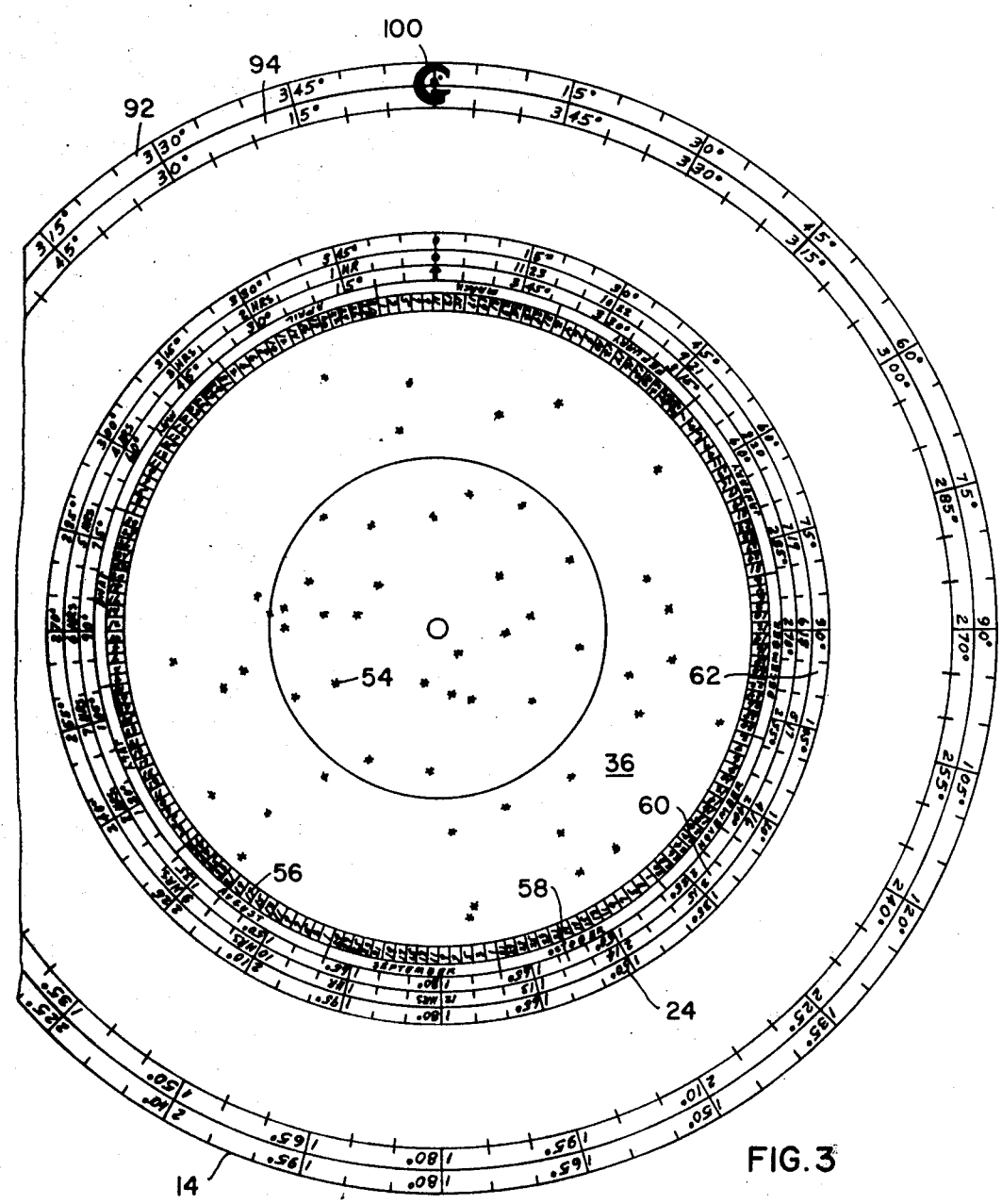
FIG. 3 is an enlarged plan view of the one side of the planisphere of FIG. 1 with the sky mask dial, reference rule and Greenwich dial removed therefrom.

The sky map dial 24 in the configuration shown in FIG. 3 includes a representation of the ground position of the most important stars 54 in the northern hemisphere. Radially outwardly of the sky map 36, the sky map dial 24 shown in FIG. 3 is provided with a date scale 56, a right ascension degree scale 58, a right ascension hours of sidereal time scale 60 and a sidereal hour angle scale 62. As shown, the sidereal hour angle scale 62 proceeds clockwise and the right ascension degree and hours of sidereal time scales 58 and 60 are counterclockwise.

Figure 4:
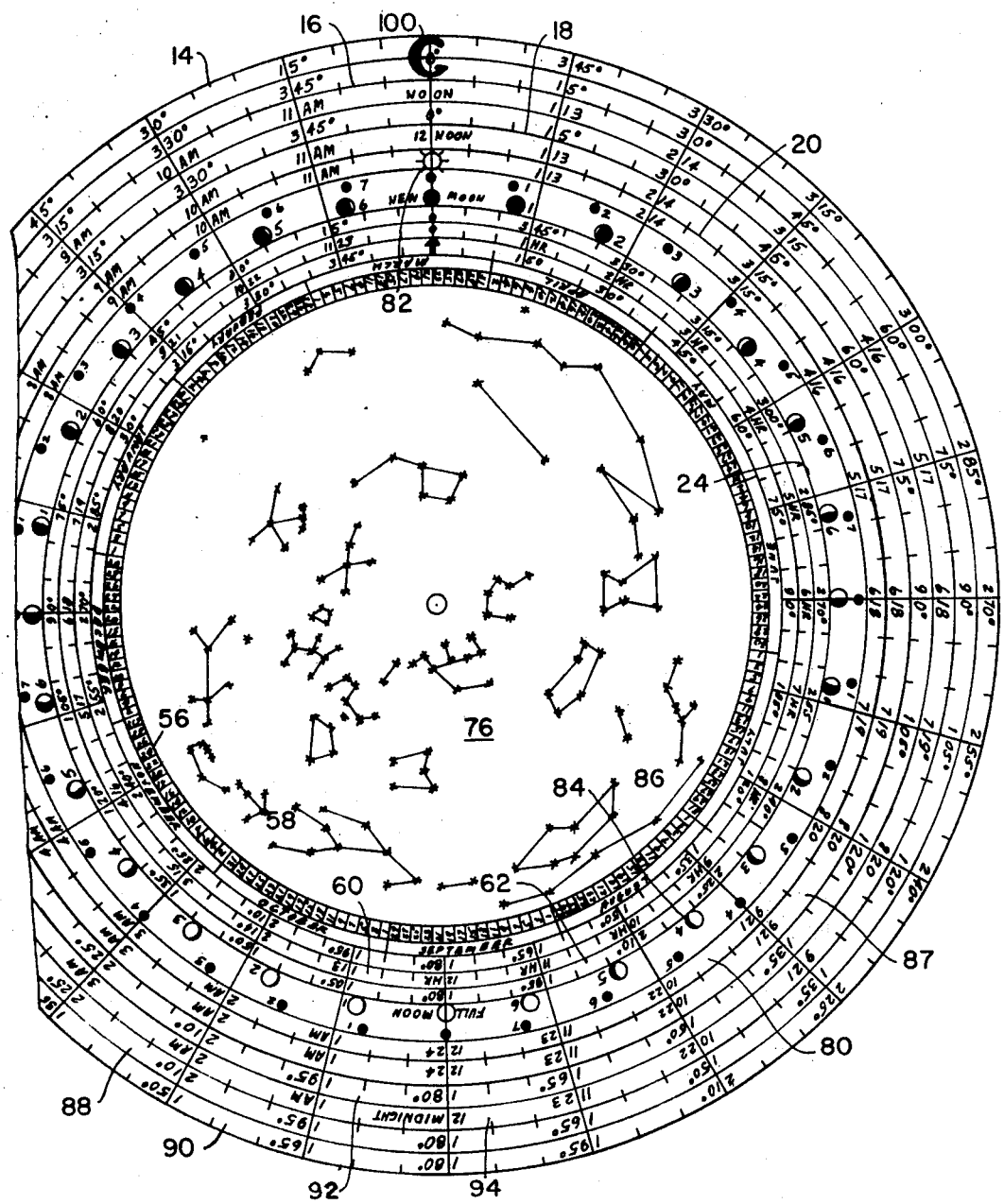
FIG. 4 is an enlarged plan view of the other side of the planisphere of the invention for use with an assumed position in the northern hemisphere similar to FIG. 3 which has an overhead north configuration and includes an overhead north sky map dial.
Figure 5:
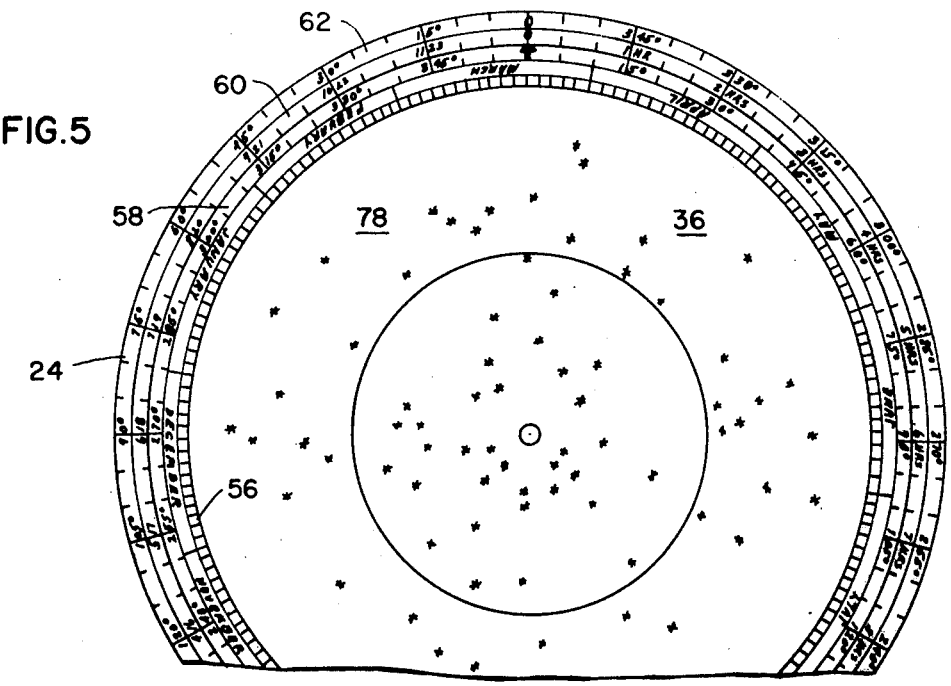
FIG. 5 is a partial plan view of the reverse side of the ground position north sky map illustrated in FIG. 3 showing the ground position south sky map.

If the sky map dial 24 were in an overhead north configuration or in a ground position south configuration, as shown in FIGS. 4 and 5, these scales would be in the opposite direction.

The overhead north and ground position south configuration for the planisphere 12, including dials 14, 16, 18, 20 and 24 on which the scales are reversed in direction, is illustrated in FIG. 4 in conjunction with the overhead north sky map 76.

Figure 6:
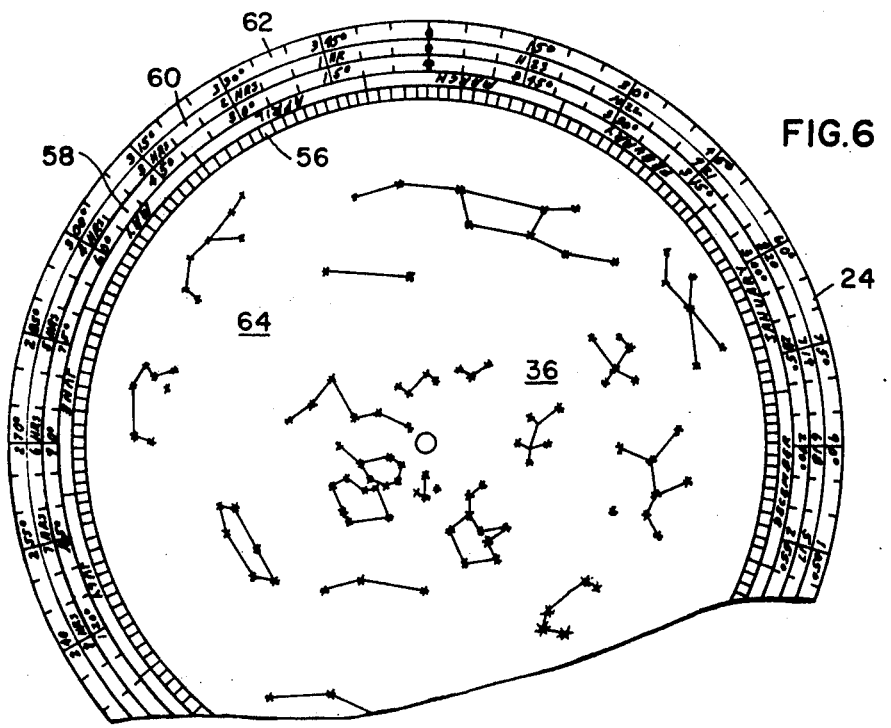
FIG. 6 is a partial plan view of the reverse side of the overhead north sky map illustrated in FIG. 4 showing the overhead south sky map.

In an overhead south configuration, as shown in FIG. 6, the scales on the sky map dial would be in the same direction as in the ground position north configuration shown in FIG. 3.

In FIGS. 3, 4, 5, and 6, the star configurations for ground position north, overhead north, ground position south and overhead south, respectively, are represented.

The sky map 36, illustrated in FIG. 6, may be printed on the back of the sky map dial 24 shown in FIG. 4, so that the remaining dials of the planisphere in the overhead south and ground position north configuration may be used in conjunction therewith. The sky map configuration 36 illustrated in FIG. 5 may be printed on the back of the sky map dial 24 illustrated in FIG. 3.

The planisphere configuration illustrated in FIG. 4 is completed with a Greenwich dial 22 and with a sky mask dial 26.

The different configurations provide flexibility of use of the planisphere of the invention in either the northern or southern hemisphere and permit a star display for either navigation or astronomy purposes in the manner most normal to either the astronomer or navigator. The two dides of diodes planisphere as well as both sides of the sky map dials may be color coded to provide identical color for all dials correctly in use on either side of the planisphere.

As shown in FIG. 4, the local time dial 20 includes a time scale 80 proceeding clockwise from midnight. A sun indication 82 is provided at the noon position on the local time dial 20. Radially inwardly of the local time scale 80, both 28 day 84 and 32 day 86 moon phase indications proceeding clockwise are also provided on the local time dial for use in estimating moon phases in conjuncion with known almanac information.

Standard time dial 18 extends radially outwardly from the local time dial 20, and is provided with a standard time scale 87 thereon, also proceeding clockwise.

The Greenwich mean time and sun angle dial 16 includes both a sun angle scale 92 proceeding clockwise and a Greenwich mean time scale 94 proceeding clockwise from midnight, as shown in FIG. 4. The Greenwich mean time and sun angle dial 16 is used essentially in astronomical applications and as shown in FIG. 1 is deleted from the ground position side of the planisphere along with the local and standard time dials.

The navigation east and west dial 14 has both navigation east and navigation west scales 88 and 90 at the outer periphery on both sides thereof. The scales 88 and 90 extend for 360° counterclockwise and clockwise, respectively, from a zero position at which Greenwich is indicated with a large G 100, as shown in FIGS. 1 and 3. The navigation east and west scales are useful in navigational computations.

In the broader sense, scales 88 and 90 teach the reciprocal nature of their mutual bond essential in principle to the study of navigation. These scales also graphically demonstrate the principle of reversibility employed throughout the design structure of the planisphere 12 and are, of course, directly related to the sidereal hour angle and right ascension methods of astronomical computation.

In addition, the navigation east and navigation west scales permit a more conceptually correct visualization of problem solving by assuming a position in one hemisphere and measuring east or west than is possible with the currently popular navigational method of problem solving including always measuring to the west by assuming a position beyond the South Pole looking toward the North Pole of the terrestrial sphere.

In the structure of the planisphere 12, as shown in FIGS. 1 and 2, the reference rules 28, the scale indicator portions 38 of the sky mask dials 26, the Greenwich indicator portions 52 of the Greenwich dials 22, and the Aries indicator portion 63 of the sky map dials 24 are connected together at their radially outward extremity and are progressively shorter radially, respectively, as shown.

With such structure, the reference rules 28 may be moved over the scale indicators 38, Greenwich indicators 52 and Aries indicators 63 in programming the planisphere 12. Similarly, the scale indicator may be moved over the Greenwich indicator and Aries indicator. The Greenwich indicator and Aries indicator can move into contact with each other but cannot pass through or over each other, since in a ground position configuration, the Greenwich dial is placed over the sky map dial, while in an overhead configuration, the sky map dial is placed over the Greenwich dial. Thus, the Greenwich indicators and Aries indicators conflict on at least one side of the planisphere 12. However, the Greenwich and Aries indicators can be moved through substantially 360° with respect to each other in programming the planisphere.

As an example of the use of the planisphere for purposes of astronomy, assume that it is desired to provide a celestial sphere display of the stars primarily for astronomical purposes on a predetermined day at a selected time and to provide that display in a Copernican manner. Referring particularly to the planisphere structure 12 in the configuration illustrated in FIG. 4 and the side thereof shown, the date on the sky map, for example March 11, is positioned opposite the sun indication on the local time dial 20. Subsequently, the sky mask dial 26 is rotated to place the meridian indicator line 44 on the selected time on the local time dial. The horizon limits 34 for the observer's latitude are then considered to define the horizon of the observer which includes therewithin all of the stars visible on the predetermined date at the selected time.

As the sky mask dial 26 is rotated, the Copernican theory of orientation of the heavenly bodies is evident, particularly if the Greenwich indicator 52 of dial 22 on the opposite side of the planisphere 12, as shown in FIG. 1, which has a North Pole centered azimuthal equidistant projection map imprinted thereon, as aligned with the meridian indicator line 44 so that when considering both sides of the planisphere the Earth appears to rotate relative to a fixed sun position locked into a predetermined date.

With the planisphere 12 as shown in FIG. 4 so programmed, it may then be held vertical with the meridian indicator 44 pointing down and with the holder of the planisphere facing south. The sky immediately presented to the observer should then be properly oriented with the planisphere for direct comparison. As the observer turns to the right or left, the planisphere may be slowly rolled or rotated about the center thereof to maintain the exact sky picture immediately presented to the observer on the planisphere.

The planisphere of FIG. 4 may then be turned over and with a ground position north sky map, as shown in FIGS. 1 and 3 thereon, computations similar to those described immediately above may be made for navigational purposes.

During such operation, the completely integrated system aspect of the planisphere is evident. Thus, in programming the ground position side of the planisphere, the overhead side of the planisphere is also programmed so that switching from side to side of the planisphere for checking purposes or due to greater familiarity with the overhead astronomy approach or the ground position, navigation approach is possible. For example, navigation stars on the ground position side of the planisphere may be checked with the location of these stars in their constellations given on the overhead side of the planisphere.

The system aspect of the planisphere 12 is further emphasized due to the position of the ground position and overhead sky maps on the opposite sides of the planisphere. Thus, with the planisphere positioned horizontal with the ground position sky map side up, the overhead sky map is conceptually correctly oriented so that it may be viewed with understanding by merely raising the planisphere to look at the underside of it.

The completeness of the universal planisphere 12 is evident by considering an observer who moves from one hemisphere, the northern hemisphere discussed primarily above, to the southern hemisphere where overhead south and ground position south sky maps must be used. When it is desired to function with overhead south and ground position south sky maps, the sky map dials 24 along with the required associated dials are turned over and exchanged, and the planisphere is operated as above for both astronomy and navigation in the southern hemisphere.

The two sides of the planisphere 12 and the two sides of the sky map dials 24 and the associated dials which are printed on both sides as indicated above are color coded to maintain a single color as for example blue on one side and black on the other side for all correct positioning of the sky maps 24 on the planisphere 12. Thus, use of sky maps and associated dials which do not properly relate to the planisphere dials is prevented. The reference rules 28 and azimuth and altitude circle 30 may be color coded red, indicating that they may be used on either side of the planisphere.

Thus, the concept of the universal planisphere 12 is of a completely integrated single instrument which can be used for complete astronomical and navigational calculations in both the northern and southern hemispheres to replace the limited utility of the prior structures such as the Navy Star Finder and Identifier 2102-D. Further, the added utility of the planisphere 12 is accomplished with conceptual accuracy by assuming an observer's position in either hemisphere and going right or left for east or west as required instead of assuming a false position beyond the South Pole and proceeding in one direction always for west and the opposite direction for east as urged in prior navigation techniques.

The planisphere in use as a navigational instrument, including the ground position north sky map as shown in FIG. 3, may be used to solve the usual navigator's time diagram, as discussed on page 89 of the reference book, "Navigation The Easy Way" by Carl D. Lane and John Montgomery, published by W. W. Norton Company, Inc., New York, New York, in 1949.

In such operation, the Greenwich time is provided by a separate timepiece. Any correction due to the positioning of the user east or west of a standard meridian can be made through the use of the standard and local time dials 18 and 20 on the other side of the planisphere, as explained in the above referenced prior patents and patent application. These time dials are not necessary to the use of the planisphere in navigation for determining meridian angle as will be seen from the following discussion.

Consider the assumed longitude of 48° west, a sidereal hour angle of a star of 188° and a Greenwich hour angle of Aries of 88°. Further, assume that the date is Feb. 3, 1967, and the Greenwich mean time is twenty-one hundred hours. In other words, the local hour angle of the star would be 228° to the west of the assumed position or 132° to the east.

To determine local hour angle or meridian angle, the three indicators, scale indicator 38, reference indicator 28, and Greenwich indicator 52 are used. First, move the Greenwich mean time dial 16 to twenty-one hours at the zero indication on the Greenwich hour angle dial 18. Place the sun symbol 82 on the local time dial 20 at the zero degree indication on the Greenwich time dial 16. Move south meridian line 50 on the Greenwich dial 22 to zero indication on the Greenwich hour angle dial 16 and move the sky mask dial 26 so that the south meridian line 44 indicates 48° west on the Greenwich hour angle dial 16. Then add the measure of Aries 88° to the sidereal hour angle of the star 188° to obtain 276° applied to the Greenwich hour angle dial 16. The reference indicator 30 is used for this purpose. The meridian angle is then 132° to the east and is automatically measured on the meridian angle scale 32 of the sky mask dial 26 where the reference indicator 26 crosses the meridian angle scale.

The meridian angle, which is 132° in the present example, is then used in conjunction with standard tables of Computed Altitude and Azimuth, published for example in the Hydrographic Office publication Number 214, by the U.S. Government, in proceeding to determine the Sumner line of position, as disclosed in the above referenced publication, "Navigation The Easy Way" by the Marq St. Hilaire method.

The altitude and azimuth of additional navigational stars may also be found by the mathematical approach indicated above for triangulation.

At this point it should be noted that only the $d$ correction is used in the discourse on navigation contained herein.

For rough approximations or in addition to the mathematical approach indicated above, the altitude and azimuth of the selected navigation star may also be used with the reference rule 30 to facilitate pointing at the navigation stars useful to determine the intercept correction and to establish the exact position of the navigator by triangulation.

The planisphere structure of the invention as disclosed above and when operated as indicated has other advantages which make mistakes in computing practically impossible. Thus, due to the dual-sky concept of planisphere 12 and because the altitude-azimuth circle of the reference indicator is applied in surface navigation at the assumed position of the navigator, based on the readings of the trigonometric developed results as logged, the azimuthal considerations are legitimately expressed in terms of AZ which can be taken directly from H.O. 214 instead of the complement $A_n$ as is necessary with prior one-sky concept navigational aids.

Also with the planisphere 12, once the programming of the time dials on the astronomical side are set, the position of the sun symbol also automatically indicates whether the navigator should apply the same navigational date of the navigator or not as he takes readings from the Nautical Almanac. Thus, when the sun symbol falls between the midnight position of the navigator ($m$) and the midnight position of Greenwich ($g$), two different dates are indicated. When the sun symbol falls outside these two date control indicators, then the navigational date of the navigator and Greenwich are the same.

Figure 11:
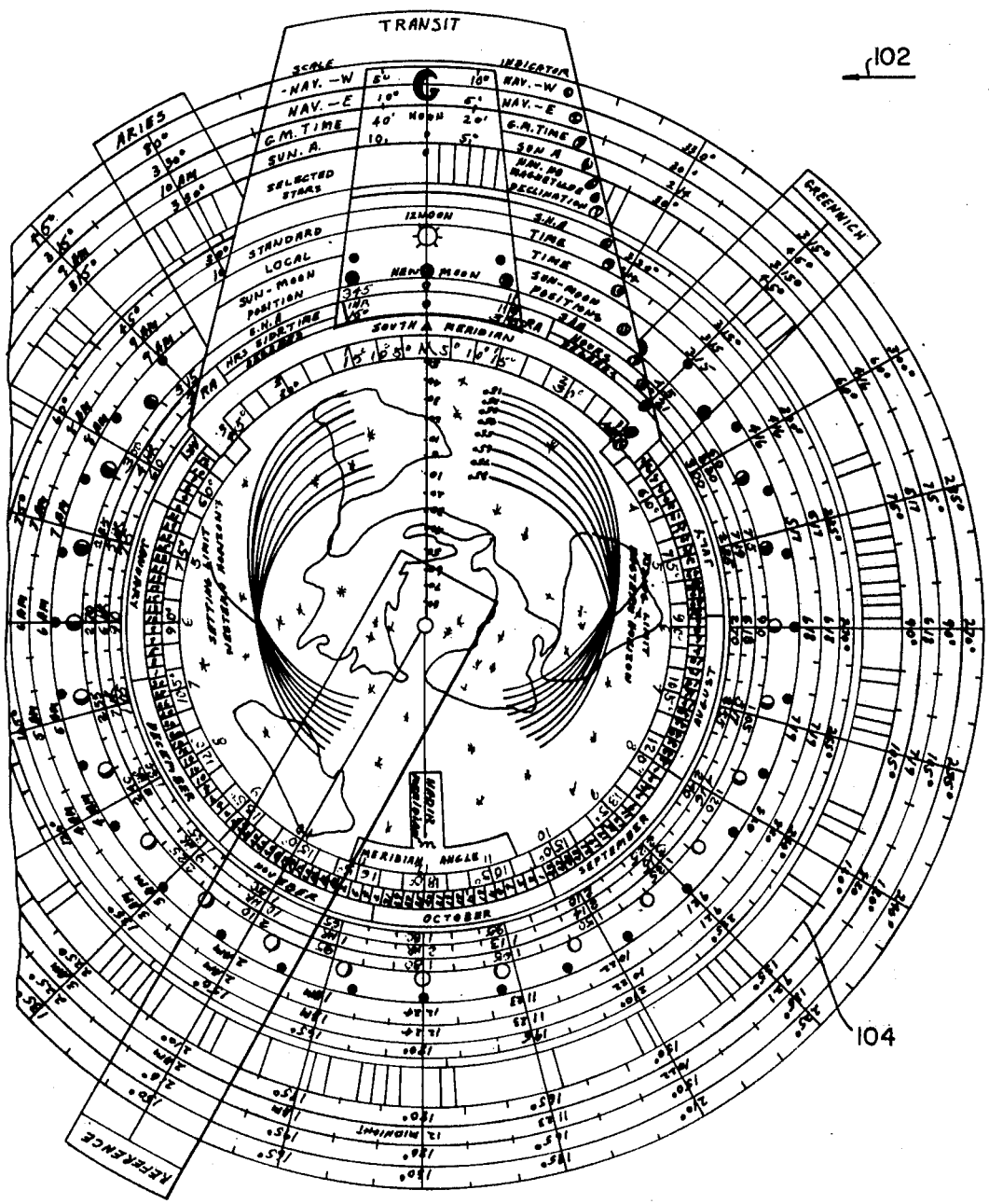
FIG. 11 is a composite plan view of a modified planisphere, such as illustrated in FIG. 1 on which the navigation number, magnitude, and declination of selected stars are provided.

In the modified planisphere structure illustrated in FIG. 11, an additional dial 104 is provided between the Greenwich hour angle dial and the standard time dial. The dial 104 includes navigation star information thereon. As shown, the navigation number of the star, the magnitude of the star and the declination of the star at a particular latitude are displayed.

In other respects, the planisphere 102 is similar to the planisphere 12 and may be used for providing desired displays of the heavenly bodies and for solving the navigator's time diagram without mathematical computation as set forth above.

While one embodiment and a modification of the present invention have been considered in detail, it will be understood that other embodiments and modifications are contemplated by the inventor.

Further, it will be understood that the principles behind the particular planisphere structure disclosed above are universal in application. Thus, for example, the same application of straight-line navigational procedure using azimuthal equidistant projections set forth above is equally as valid when applied to spacecraft navigation. Once the astronauts' position as it relates to the fixed background of the sky objects is determined, Houston Control Center is in a position to determine a straight-line course to bring the spaceship to a predetermined location on Earth or on the moon and fix the time of arrival of the spacecraft at the location.

The astronauts could use the planisphere 12 to check their position in space against a reference of fixed stars and true north on the Earth as above. Subsequently, after being given a straight-line course from Houston to enable time to properly approach Earth considering the required recentry angle, Earth gravity, desired splash-down point, etc., the astronauts could use the planisphere 12 to check the course given them by using a reverse procedure working back from the required splashdown point but still considering point-to-point navigation in a straight line.

Further, it is pointed out that straight-line navigation is conceptually correct in both space and terrestrial navigation since two points either in space or on the Earth when projected on a parallel plane through the center of the Earth define a straight-line vector on the plane. Such vector also includes the projection of all points on a great circle through the two points. Such a parallel plane serves navigation better than measurements on a sphere which fails to suggest altitude. Also, such straight-line navigational techniques thus allowed permit the use of the reference indicator as described above.

It is therefore the intention to include all embodiments, modifications and applications as are encompassed by the appended claims within the scope of the invention.

What I claim as my invention is:

1. A planisphere comprising a plurality of concentric dials of progressively smaller diameter, a sky map on the smallest diameter dial having an Aries indicator portion extending radially therefrom, a Greenwich indicator dial having a Greenwich indicator portion extending radially therefrom positioned concentric with and adjacent the smallest diameter dial, a reference rule extending radially outwardly of the planisphere over the Greenwich indicator dial and plurality of dials, a sky mask dial positioned over and concentric with the Greenwich indicator dial having a transit scale indicator portion extending therefrom and means securing all the dials and reference rule together centrally of the dials for rotation relative to each other.

2. A system as set forth in claim 1 wherein the Greenwich indicator dial, reference rule, and sky mask dial are constructed of a transparent material.

3. A system as set forth in claim 1 and further including a polar centered azimuthal equidistant projection map on the Greenwich indicator dial having the Pole position in the center thereof.

4. A system as set forth in claim 1 and further including a plurality of horizon lines on the sky mask dial indicating the horizon of a viewer at different latitudes on the sky map.

* * * * *